Dec. 26, 1950 W. VANGOR 2,535,881
MICROMETER HEIGHT GAUGE
Filed July 12, 1948

Inventor
William Vangor
By Wooster & Davis Attorneys

Patented Dec. 26, 1950

2,535,881

UNITED STATES PATENT OFFICE 2,535,881

MICROMETER HEIGHT GAUGE

William Vangor, Bridgeport, Conn.

Application July 12, 1948, Serial No. 38,211

5 Claims. (Cl. 33—170)

1

This invention relates to gauges and more particularly to micrometer height gauges for use by machinists, tool makers and the like for measuring heights above a certain surface, as a bed-plate or the like.

An object of the invention is to provide a micrometer gauge in which there is substantially no back-lash or lost motion in the operation of the feed stem or screw, thus increasing the accuracy of the gauge.

Another object of the invention is to provide novel preloading means on the screw of a micrometer height gauge whereby back-lash and lost motion are substantially eliminated.

A further object of the invention is the provision of tension means between the threads of a screw and of its corresponding nut for the elimination of back-lash and lost motion.

Another object of the invention is to provide adjustable means for positioning the barrel of the height gauge in a true vertical relationship to the measuring surface.

Other objects of the invention will be apparent from the following description and accompanying drawing taken in connection with the appended claims. However, I desire to have it distinctly understood that I do not intend to limit myself to the exact details shown or described, but that I intend to include as part of my invention all such obvious changes and modifications of parts as would fall within the scope of the claims.

Figures 1, 2, 3, 4, 5:
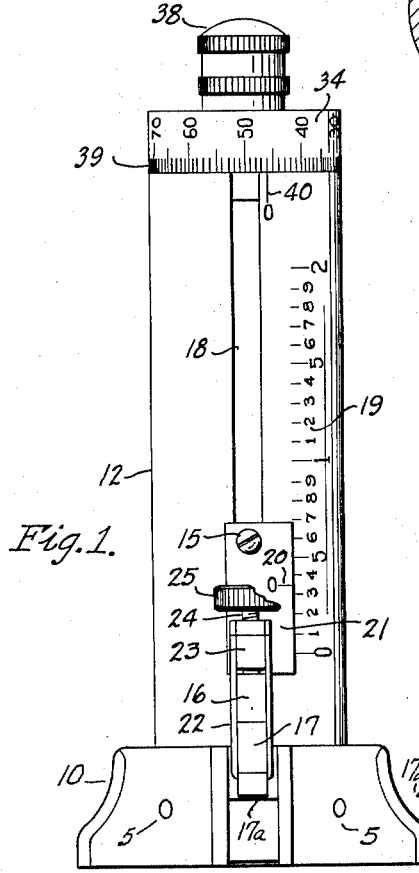
Fig. 1 is a front view of the micrometer height gauge.
Fig. 2 is a side view of the gauge device with some of the parts broken away to show its internal structure.
Fig. 3 is a top view partly in section taken on line 3—3 of Fig. 2.
Fig. 4 is a top plan view of the device showing some of the details within the base.
Fig. 5 is a section of the adjusting nut substantially on plane of line 5 in Fig. 2.

Referring now to the drawing, the numeral 10 indicates a base to support the device on the surface 11 from which the height is to be measured, and carries an upright hollow or tubular barrel 12 in which is mounted the lead or adjusting screw 13 on which is threaded the scriber carrying nut 14. Attached to nut 14 by means of screw bolts 15 is the L-shaped support 16 for the scriber 17. The front side of the nut is flattened at 14a against which the upright leg of support 16 is seated and held by screws 15. In

2 the front wall of barrel 12 there is provided a vertical slot 18 through which support 16 projects and along which said support moves longitudinally. Alongside said slot 18 the barrel is provided with a scale 19 over which a zero mark 20 on a plate 21 carried by the support 16 moves to indicate the height of the point 17a of the scriber 17 above the supporting surface 11. The scriber 17 is adjusted upwards or downwards by the movement of nut 14 on the screw 13.

The scriber 17 is held in rigid association with the lower leg of support 16 by means of yoke 22 having an opening through which member 16 and the stem of the scriber extend and in which they are clamped by the screw 24 which is adjustable by knurled screw head 2.

The adjusting screw 13 is mounted so that even slight rotation of it in either direction will start to shift the nut 14 and the scriber 17 so that there is no back-lash or lost motion, making the device very accurate. For this purpose the screw 13 is mounted at its upper end in a ball bearing 26 mounted with its outer ball race ring 26a recessed into the upper end of the barrel at 27, and at its lower end in a similar ball bearing 28 mounted with its outer ball race ring 28a recessed into the lower end of the barrel at 29. The bearings 26 and 28 are preloaded so that there is no lost motion and the screw is accurately held stationary against longitudinal movement, so that immediately the screw is turned the nut 14 starts to move. This is accomplished by having the lower end of screw 13 mounted in the inner ring 30 of the lower bearing and held by a screw 31. The upper end of this screw passes through the inner ball race ring 32 of the upper bearing 26, and is tapped at its upper end to receive the threaded stem 36 of a thumb nut 38. This nut has a collar portion 35 of greater diameter than the screw and forming a shoulder 35a against which the end of the screw is clamped by action of the stud 35. The upper edge of the inner bearing ring 32 is also seated against this shoulder. The web or horizontal wall 3 of a cupped member or cap 34 rests on inner ring 32 of the upper bearing and is provided with an opening in which the collar portion 35 of the thumb nut is fitted and to which the member 34 is secured by the set screw 42. The member 34 is not threaded on the screw.

The lower end of screw 13, as indicated at 13a, is spaced a short distance from the head of screw 31 which has a stem 31a threaded into a tapped opening in the lower end of the screw 13. The head of screw 31 is large enough to overlap the inner ring 30 of the lower bearing 28, thus when this screw 31 is tightened it draws down on screw 13, clamping the outer rings of bearings 26 and 28 against the seats 27 and 29 and preloading the bearings 26 and 28. The cap 38 through the stem 36 provides a finger grip for rotating the adjusting screw 13. The outer wall of the cup 34 is provided with a micrometer scale 39 running against the zero line 40 on the barrel and this is calibrated in hundredths of the calibrations in the scale 19, so they can read in thousandths or ten-thousandths, like a micrometer scale. The cap 34 has an aperture 41 through which the set screw 42 is threaded for the purpose of fixing the position of cap 34 with relation to member 35. In this manner the calibrations 39 on the cap may be properly adjusted to the zero line 40 after the member 35 has been firmly fastened to screw 13.

However, in order that the nut 14 may move immediately with turning of the screw 13, this nut is also preloaded on the screw. This preloading is accomplished by the coaction of the tapered or inclined side walls 47 of the threads in the nut 14 and the correspondingly inclined side walls 48 of the threads on the screw. The nut is resilient and is longitudinally slit at one side as shown at 49. When the nut is in its normal condition off the screw, the threaded opening through it is of a somewhat smaller diameter than the screw 13, so that when it is threaded onto the screw it is expanded somewhat against the resilient action of the metal of the nut. The threads are also formed so there is a clearance between the tops of the threads on the screw and the bottoms of the grooves between the threads in the nut. Also there is a similar clearance between the tops of the threads in the nut and the bottoms of the grooves between the threads on the screw, both as shown at 50 in Fig. 2. The clamping of the inclined side walls of the threads in the nut on the similarly inclined side walls of the threads on the screw preloads the nut on the screw and insures that there is no looseness or lost motion between the nut and the screw, so that the nut moves immediately in either direction on the slightest turning of the screw. The amount of the pressure of the nut on the screw is controlled by the tapered aperture 42 into which is threaded a similarly tapered set screw 43. The set screw 43 may be adjusted through aperture 44 when said screw 43 is brought opposite said aperture by turning screw 13. The tightening of set screw 43 provides a wedging action, the force of which thrusts sections 45 and 46 of nut 14 in opposite directions making the nut looser on the screw. Loosening of screw 43 or backing it outwardly permits the nut to contract and more tightly grip screw 13. Clamping action of the nut may be increased by one or more resilient clamping rings 51 located in grooves in the outer wall of the nut. Thus the nut 14 becomes preloaded upon screw 13, taking up any lost motion or slack between the screw and the nut, and the nut begins to move on the slightest turning movement of the screw.

Provision is also made for adjusting the barrel 12 to a true vertical position with relation to surface 11, and for securing said barrel firmly to base 10. A tapered or bevelled groove 52 is provided in the outside periphery of the barrel 12 within base 10. Set screws 53 threaded into apertures 54 seat at their inner ends in said groove 52 and when tightened press against the inclined wall thereof to hold barrel 12 firmly positioned in base 10. (See also Fig. 4.) By the combined adjustment of the three set screws 53 the barrel 12 may be positioned in a perfectly perpendicular position in relation to surface 11 or base 10 so that scriber 17 may measure a true height.

The present invention provides a micrometer height gauge whose accuracy is superior to that of previous devices in that back-lash and lost motion are substantially eliminated. Other similar devices depending upon threaded screws for their accuracy can be greatly improved by means similar to those disclosed herein.

While the present invention, as to its objects and advantages has been described herein as carried out in a specific embodiment thereof, it is not desired to be limited thereby but it is intended to cover the invention broadly within the scope of the appended claims.

Having thus set forth the nature of my invention, I claim:

1. A micrometer height gauge which comprises a base, a barrel extending vertically from and carried on said base, bearings in each end of said barrel, an adjusting screw rotatably carried by said bearings, transversely tapered threads on said screw, a split nut having an opening through it provided with similarly tapered threads movable upon the threads of said screw and normally of smaller diameter than the screw so that the screw expands the nut somewhat to cause the threads of the nut to clamp against the screw threads, indicating means attached to said nut, an aperture in the split in said nut and wedging screw means within said aperture for limiting closing action of the nut to control clamping action of said nut on said screw.

2. A micrometer height gauge which comprises a base, a barrel extending vertically from and carried on said base, ball bearings in each end of said barrel, an adjusting screw rotatably carried by said bearings, a longitudinally split nut movable upon the threads of said screw, said nut and screw having similarly transversely tapered threads and said nut including means for clamping it on the screw, indicator means attached to said nut, an aperture in the split in said nut, adjustable means within said aperture for expanding the nut to vary the clamping action of said nut on said screw, and means for preloading said adjusting screw on said bearings to remove lost motion between them.

3. A micrometer height gauge comprising a base, a barrel extending vertically from and mounted on said base, ball bearings in each end of said barrel, an adjusting screw rotatably carried by said bearings, screw means preloading said adjusting screw on said bearings to remove lost motion between them, a nut movable on the threads of said adjusting screw and shiftable relative to the barrel by rotation of the screw, indicating means carried by the nut, means for preloading said nut on said adjusting screw to remove lost motion between them, a peripheral groove in the lower end of said barrel transversely tapered on one side, and screw means cooperating with the tapered side of said groove to adjust the position of said barrel with relation to the base.

4. A micrometer height gauge comprising a base, a tubular barrel extending vertically from and mounted in said base, outwardly facing shoulders at the opposite ends of said barrel, ball bearings comprising inner and outer rings mounted with their outer rings seated against said shoulders, a rotatable adjusting screw mounted in the inner rings of said bearings, a finger grip having threaded connection with the upper end of the screw and provided with a shoulder abutting against the upper side of the inner ring of the upper bearing, said screw being of lesser length than the distance between the upper and lower sides of the inner rings of the upper and lower bearings respectively, a preloading screw, threaded into the lower end of the adjusting screw, a head on the screw engaging the lower side of the inner ring of the lower bearing, means for operating the preloading screw to apply pressure to the outer ends of the two inner bearing rings to preload the bearings, an adjusting nut on the adjusting screw, and an indicating means carried by the nut at the outer side of the barrel.

5. A micrometer height gauge comprising a base, a tubular barrel extending vertically from and mounted in said base, outwardly facing shoulders at the opposite ends of said barrel, ball bearings comprising inner and outer rings mounted with their outer rings seated against said shoulders, a rotatable adjusting screw mounted in the inner rings of said bearings, means at the upper end of the screw for operating it, a shoulder carried by the screw forming an abutment for the upper end of the inner ring of the upper bearing, said screw being of lesser length than the distance between the upper and lower ends of the inner rings of the upper and lower bearings respectively, a second screw threaded into the lower end of the adjusting screw, a head on the adjusting screw overlapping the outer end of the inner ring of the lower bearing, said second screw being adjustable to put pressure on the outer ends of the inner rings of the two bearings to preload these bearings, an adjusting nut mounted on the adjusting screw to be shifted thereby, and indicating means carried by the adjusting nut.

WILLIAM VANGOR.

REFERENCES CITED

The following references are of record in the file of this patent:

UNITED STATES PATENTS

| Number | Name | Date |
| --- | --- | --- |
| 491,926 | Nutt | Feb. 14, 1893 |
| 1,824,153 | Jacobs | Sept. 22, 1931 |
| 1,982,366 | Baninger | Nov. 27, 1934 |
| 2,394,137 | Barlow | Feb. 5, 1946 |